March 12, 1940.  A. L. MacCRACKEN  2,193,734
METHOD OF BALANCING ROTATING OBJECTS
Filed March 9, 1935
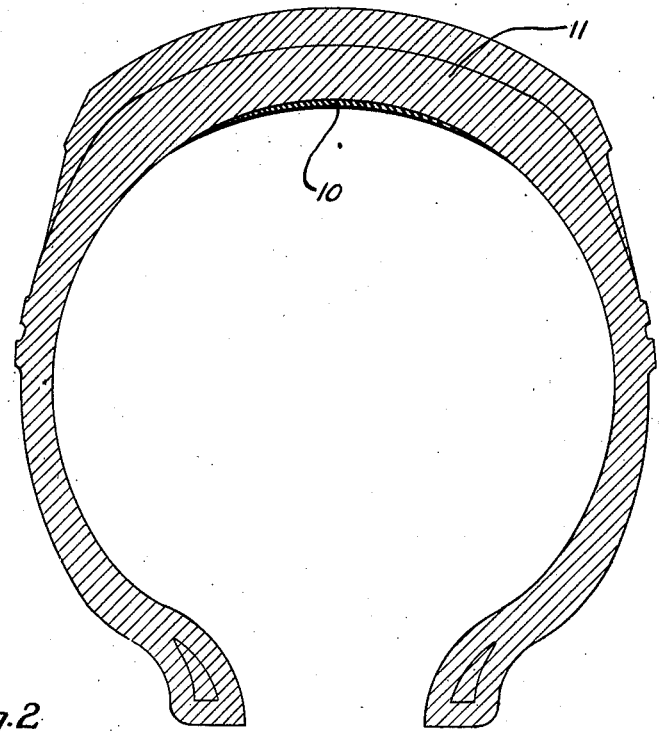
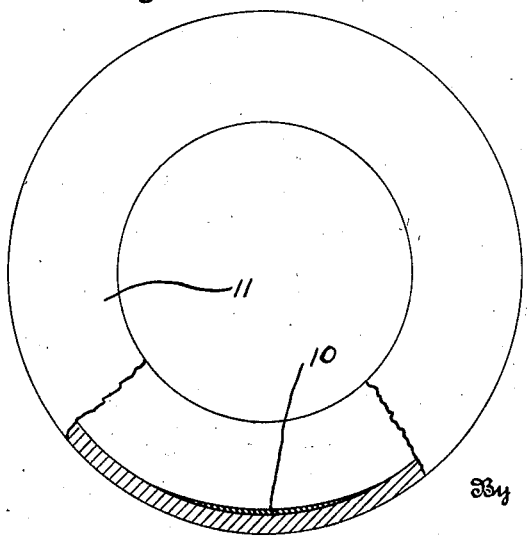
Inventor
Alan L. MacCracken Patented Mar. 12, 1940

2,193,734

UNITED STATES PATENT OFFICE 2,193,734

METHOD OF BALANCING ROTATING OBJECTS

Alan L. MacCracken, Akron, Ohio, assignor to Wingfoot Corporation, Wilmington, Del., a corporation of Delaware Application March 9, 1935, Serial No. 10,234

6 Claims. (Cl. 154—14)

The present invention relates to counterbalancing overbalanced rotating objects, and it has particular relation to balancing pneumatic tire casings which are slightly overweighted on one side but which are otherwise in accordance with prescribed specifications.

One of the objects of the invention is to provide a method of weighting the light side of an overbalanced rotating object such as a tire casing or the like, which will result in the weighting material being distributed over a substantial area without causing the tire to bulge at any local point.

With these objects in view, as well as other advantages which may be incident to the use of the improvements, the invention consists in the parts and combinations thereof hereinafter set forth and claimed with the understanding that the several necessary elements and method steps constituting the same may be varied in proportion and arrangement without departing from the nature and scope of the invention as defined in the appended claims.

In order to make the invention more clearly understood there are shown in the accompanying drawing, means for carrying the invention into practical effect, without limiting the improvements in their useful application to the particular construction and method of application, which for the purpose of explanation have been made the subject of illustration.

Fig. 1 is a cross-section taken through a tire embodying my invention, and

Fig. 2 is a side elevation of the tire shown in Fig. 1 with a portion of the same broken away to show the balancing material as applied to the tire.

Referring to the drawing, a counterbalancing material 10 embodying the present invention is applied in a plastic state and evenly distributed in a smooth layer upon the interior surface of the light side of an overbalanced tire casing 11, by means of a trowel or other suitable tool or machine. This counterbalancing material comprises a plastic base of any suitable composition preferably a self-vulcanizing rubber cement. If desired, a relatively heavy substance in finely divided particles may be incorporated in the material so as to augment its weight, thus reducing the amount of material necessary to balance the casing and the space occupied by the material.

The substance used as a bond or binder may be of any suitable composition but is preferably one having a flexible highly adhesive character. Also, the substances employed to increase the weight of the plastic material or cement may be of any suitable metals or minerals or derivatives thereof, such as finely divided lead, zinc, zinc oxide, barium sulphate, lead sulphate, etc., or any suitable combinations thereof.

For example, if the material employed as a base or binder is a self-vulcanizing rubber cement, and if it is desired to shorten the period of vulcanization, it may be found expedient to use zinc or lead oxide as a weighting substance. This is because these oxides also function as activators in hastening the action of the accelerator contained in the cement. The period of time required for the cement to cure may be as short as forty-eight hours but experiments have proven that the best results are obtained if about three days are allowed for the cement to become thoroughly vulcanized.

The above-described method and material provides a very satisfactory counterweighted area within the casing having a smooth, evenly distributed relatively flexible surface which will not crack, chip or peel off and which will not chafe or otherwise injure the inner tube. While the present method has been described in connection with overbalanced tire casings, it will be understood that it is also applicable to rotating objects of other types and construction.

In carrying out the invention other materials and combinations thereof may be employed, either as a bond or binder or as a weighting medium without departing from the spirit and scope of the invention as defined in the appended claims.

What I claim is:

1. The method of balancing overbalanced tire casings which comprises applying a layer of material in a plastic state to the interior surface of the light side of the casing in an amount substantially equal in weight to that of the overbalance of said casing.

2. The method of balancing overbalanced tire casings which comprises applying a layer of rubber cement to the interior surface of the light side of the casing in an amount substantially equal in weight to that of the overbalance of said casing.

3. The method of balancing overbalanced tire casings which comprises applying a layer of material in a plastic state to the interior surface of the light side of the casing in an amount substantially equal in weight to that of the overbalance of said casing, said material containing a quantity of a relatively heavy substance in finely divided particles to augment the weight of said material.

4. The method of balancing tire casings which comprises spreading a relatively thin layer of vulcanizable material in a plastic state to the interior surface of the light side of the casing, in an amount substantially equal in weight to that of the overbalance of said casing, and tapering the edges of the applied material to merge the edges thereof with the interior surface of the casing whereby the contour of the interior surface is not appreciably changed.

5. The method of balancing overbalanced tire casings after same have been cured which comprises adhering a self-vulcanizable material in a plastic unvulcanized state to the interior surface of the light side of the casing in an amount substantially equal in weight to that of the overbalance of said casing.

6. The method of balancing overbalanced tire casings which comprises adhering a layer of material in a plastic state to the interior surface of the light side of the casing at the periphery thereof in an amount substantially equal in weight to that of the overbalance of said casing.

ALAN L. MacCRACKEN.